(12) United States Patent
Huh et al.

(10) Patent No.: US 12,332,513 B2
(45) Date of Patent: Jun. 17, 2025

(54) MANUFACTURING METHOD OF LIGHT MODULATION DEVICE

(71) Applicant: LG Chem, Ltd., Seoul (KR)

(72) Inventors: Doo Young Huh, Daejeon (KR); Beom Jin Lee, Daejeon (KR); Sung Yoon Lee, Daejeon (KR); Nam Gyu Kim, Daejeon (KR); Dong Hyun Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 140 days.

(21) Appl. No.: 18/017,122

(22) PCT Filed: Sep. 15, 2021

(86) PCT No.: PCT/KR2021/012588
§ 371 (c)(1),
(2) Date: Jan. 20, 2023

(87) PCT Pub. No.: WO2022/060085
PCT Pub. Date: Mar. 24, 2022

(65) Prior Publication Data
US 2023/0266612 A1    Aug. 24, 2023

(30) Foreign Application Priority Data
Sep. 16, 2020  (KR) .................. 10-2020-0119125

(51) Int. Cl.
G02F 1/1333    (2006.01)
G02F 1/1339    (2006.01)
(Continued)

(52) U.S. Cl.
CPC ...... *G02F 1/133354* (2021.01); *G02F 1/1339* (2013.01); *G02F 1/1341* (2013.01);
(Continued)

(58) Field of Classification Search
CPC ............. G02F 1/133354; G02F 1/1339; G02F 1/1341; G02F 1/1337; G02F 2201/50;
(Continued)

(56) References Cited

U.S. PATENT DOCUMENTS

2001/0022646 A1   9/2001  Nishi et al.
2004/0041974 A1   3/2004  Yoshihara et al.
(Continued)

FOREIGN PATENT DOCUMENTS

CN    107430301 A    12/2017
EP    4187314 A1     5/2023
(Continued)

OTHER PUBLICATIONS

Machine English translation of KR20180120316A, Accessed Aug. 6, 2024 (Year: 2018).*

(Continued)

*Primary Examiner* — Jacob T Minskey
*Assistant Examiner* — Adrianna N Konves
(74) *Attorney, Agent, or Firm* — Lerner David LLP (57) ABSTRACT

A method of manufacturing a light modulation device is disclosed herein. In some embodiments, a method comprises transferring a first substrate between a first unwind roll and a take-up roll, wherein an adhesive layer is disposed on the a first surface of the first substrate, transferring a second substrate between a second unwind roll and the take-up roll, wherein the second substrate includes a spacer and a liquid crystal alignment film formed on a first surface of the second substrate during the transfer and prior to an attachment with the adhesive layer of the first substrate, and attaching the first and second substrates via respective first surfaces thereof by passing the first and second substrates through an opening between adjacent attachment rolls to form a light modulation device.

14 Claims, 4 Drawing Sheets

(51) Int. Cl.
*G02F 1/1341* (2006.01)
*G02F 1/1337* (2006.01)

(52) U.S. Cl.
CPC ........ *G02F 1/1337* (2013.01); *G02F 2201/50* (2013.01); *G02F 2202/04* (2013.01); *G02F 2202/06* (2013.01); *G02F 2202/28* (2013.01)

(58) Field of Classification Search
CPC .............. G02F 2202/04; G02F 2202/06; G02F 2202/28; G02F 1/133305; G02F 1/133773; G02F 1/13394; G02F 1/1303
See application file for complete search history.

(56) References Cited

U.S. PATENT DOCUMENTS

| | | |
|---|---|---|
| 2004/0209008 A1 | 10/2004 | Liang et al. |
| 2013/0230642 A1 | 9/2013 | Do et al. |
| 2018/0074377 A1 | 3/2018 | You et al. |
| 2021/0165284 A1 | 6/2021 | Lim et al. |

FOREIGN PATENT DOCUMENTS

| | | | |
|---|---|---|---|
| JP | S5317751 A | 2/1978 | |
| JP | H02253229 A | 10/1990 | |
| JP | H03116115 A | 5/1991 | |
| JP | H0713176 A | 1/1995 | |
| JP | 2000193943 A | * 7/2000 | ................ B60J 3/04 |
| JP | 2000346550 A | 12/2000 | |
| JP | 2001343654 A | 12/2001 | |
| JP | 2013037093 A | 2/2013 | |
| JP | 2018507443 A | 3/2018 | |
| KR | 100283347 B1 | 3/2001 | |
| KR | 20040019877 A | 3/2004 | |
| KR | 20050094476 A | 9/2005 | |
| KR | 20130101331 A | 9/2013 | |
| KR | 20140006514 A | 1/2014 | |
| KR | 20160080070 A | 7/2016 | |
| KR | 20160100575 A | 8/2016 | |
| KR | 20180063586 A | 6/2018 | |
| KR | 20180120316 A | 11/2018 | |
| KR | 101987373 B1 | 6/2019 | |
| KR | 102040468 B1 | 11/2019 | |
| KR | 102100459 B1 | 4/2020 | |
| TW | 200415423 A | 8/2004 | |
| TW | 200534013 A | 10/2005 | |
| TW | 201616199 A | 5/2016 | |
| TW | 202020532 A | 6/2020 | |

OTHER PUBLICATIONS

Machine English translation of KR102100459, Accessed Aug. 6, 2024 (Year: 2020).*
Machine English translation of KR101987373, Accessed Aug. 6, 2024 (Year: 2019).*
Machine English translation of JP-2000193943-A, Accessed Aug. 6, 2024 (Year: 2000).*
International Search Report for Application No. PCT/KR2021/012588 mailed Dec. 23, 2021, 2 pages.
Extended European Search Report including Written Opinion for Application No. 21869707.6 dated Feb. 5, 2024, pp. 1-10.

* cited by examiner

[Figure 1]

| |
|---|
| 100 |
| 1001 |
| 600 |
| 2001 |
| 200 |

[Figure 2]

| |
|---|
| 400 |
| 100 |
| 1001 |
| 600 |
| 2001 |
| 200 |

MANUFACTURING METHOD OF LIGHT MODULATION DEVICE

CROSS-REFERENCE TO RELATED APPLICATIONS

This application is a national phase entry under 35 U.S.C. § 371 of International Application No. PCT/KR2021/012588, filed on Sep. 15, 2021, which claims priority from Korean Patent Application No. 10-2020-0119125, filed on Sep. 16, 2020, the disclosures of which are incorporated by reference herein.

TECHNICAL FIELD

The present disclosure relates to a method for manufacturing a light modulation device.

BACKGROUND ART

Light modulation devices in which a light modulation layer including a liquid crystal compound or the like is positioned between two substrates are used in various applications.

In order for the light modulation device to exhibit the intended performance, it is important to precisely control the orientation state of the liquid crystal compound between the substrates.

Also, in order to ensure the performance of the light modulation device, it is required to secure the adhesive force of two substrates disposed opposite to each other.

Although various methods for manufacturing an optical device are known, a method capable of rapidly manufacturing a light modulation device having excellent adhesive force between two substrates while achieving a desired orientation state in a light modulation layer is not known.

DISCLOSURE

Technical Problem

The present disclosure is intended to provide a method for manufacturing a light modulation device. The present disclosure is intended to provide relates to a so-called roll-to-roll process capable of rapidly manufacturing a light modulation device having excellent adhesive force between two substrates while achieving a desired orientation state (e.g., liquid crystal orientation state) of a light modulation layer.

Technical Solution

The present disclosure may be directed to a method for manufacturing a light modulation device by a roll-to-roll process.

The manufacturing method may comprise a step of transferring a first substrate in which an adhesive layer is formed on a first surface of the first substrate, and transferring a second substrate in which a spacer and a liquid crystal alignment film are formed on a first surface of the second substrate during the transfer and prior to an attachment with the first substrate, wherein the transfer of the first and second substrates are by roll-to roll processes, and simultaneously attaching the first and second substrates so that the respective first surfaces face each other.

In the manufacturing method, no liquid crystal alignment film may be formed on the first surface of the first substrate.

In the manufacturing method, the first substrate may further comprise a release film covering the adhesive layer prior to the attachment of the first and second substrates, and the manufacturing method may further comprise a step of peeling the release film from the adhesive layer before the attachment of the first and second substrates.

In the manufacturing method, the second substrate may further comprise a protective film covering the first surface of the second substrate prior to forming the spacer and the liquid crystal alignment film, and the manufacturing method may further comprise a step of peeling the protective film from the first surface of the second substrate prior to forming the spacer and the liquid crystal alignment film on the first surface of the second substrate and before the attachment of the first and second substrates.

The manufacturing method may also further perform a step of supplying a sealant to the edge of the first surface of the second substrate before the attachment of the first and second substrates.

In the manufacturing method, a step of supplying a liquid crystal compound; a liquid crystal compound and a dichroic dye; or a liquid crystal compound and a chiral dopant to the first surface of the second substrate before the attachment of the first and second substrates may be further performed.

In the manufacturing method, the distance (d) between the first and second substrates may be adjusted so that the ratio (d/p) of the distance (d) to the chiral pitch (p) formed by the chiral dopant is less than 1.

In the manufacturing method, the spacer of the second substrate may be a partition wall spacer.

The manufacturing method may further perform a step of heat-treating the first substrate before the attachment of the first and second substrates, and this heat treatment may be performed at a temperature of 80° C. or more for 30 seconds or more.

In the manufacturing method, the attachment of the first and second substrates may be performed within a temperature range of more than 50° C. and less than 90° C.

The manufacturing method may further perform a step of heat-treating the light modulation device after the attachment of the first and second substrates, and this heat treatment may be performed at a temperature of 80° C. or more for 30 seconds or more.

Effects of Invention

The present disclosure can provide a so-called roll-to-roll process capable of rapidly manufacturing a light modulation device having excellent adhesive force between two substrates while achieving a desired orientation state (e.g., liquid crystal orientation state) of a light modulation layer.

EXPLANATION OF REFERENCE NUMERALS

100: first substrate
200: second substrate
1001: adhesive layer
2001: liquid crystal alignment film
600: light modulation layer
400: polarization layer
401: unwind roll
402: peel roll
403: attachment roll
404: sealant supply part
405: light modulation material supply part
406: sealant curing part
407: cutting part
408: take-up roll

MODE FOR INVENTION

In this specification, the terms vertical, parallel, orthogonal or horizontal, etc. and numerical values of angles used while defining angles means substantially vertical, parallel, orthogonal or horizontal and the relevant numerical value in a range without impairing intended effects, and the range of vertical, parallel, orthogonal or horizontal and the numerical range includes an error such as a production error or a deviation (variation). For example, each case of the foregoing may include an error within about ±5 degrees, an error within about ±4 degrees, an error within about ±3 degrees, an error within about ±2 degrees, or an error within about ±1 degree.

Among physical properties mentioned herein, when the measured temperature affects relevant physical properties, the physical properties are physical properties measured at room temperature, unless otherwise specified. The term room temperature is a temperature in a state without particularly warming or cooling, which may mean one temperature in a range of about 10° C. to 30° C., for example, a temperature of about 15° C. or higher, 18° C. or higher, 20° C. or higher, or about 23° C. or higher, and about 27° C. or lower. Unless otherwise specified, the unit of the temperature mentioned herein is ° C.

The phase difference and the refractive index mentioned herein mean a refractive index for light having a wavelength of about 550 nm, unless otherwise specified.

Unless otherwise specified, the angle formed by any two directions, which is mentioned herein, may be an acute angle of acute angles to obtuse angles formed by the two directions, or may be a small angle from angles measured in clockwise and counterclockwise directions. Thus, unless otherwise specified, the angles mentioned herein are positive. However, in order to display the measurement direction between the angles measured in the clockwise direction or the counterclockwise direction if necessary, any one of the angle measured in the clockwise direction and the angle measured in the counterclockwise direction may be represented as a positive number, and the other angle may be represented as a negative number.

The present disclosure relates to a method for manufacturing a light modulation device. The term light modulation device may mean a device capable of switching between at least two or more different light states. Here, the different light states may mean states in which at least transmittance, reflectance, color, and/or haze are different.

An example of the state that the light modulation device can implement includes a transparent, black, high reflection, low-reflection and/or color mode state indicating a specific color and the like, but is not limited thereto.

In one example, the light modulation device may be a device capable of switching between at least the transparent and black mode states, or a device capable of switching between the high reflection and low reflection mode states.

The light modulation device of the present disclosure may be designed to switch between at least two or more states of any one state selected from the transparent mode, black mode, high reflection mode, low reflection mode and color mode states, and another state. If necessary, other third different states or higher states rather than the above states may also be implemented.

The switching of the light modulation device may be controlled depending on whether or not an external signal, for example, a voltage signal is applied. For example, in a state of not applying an external signal such as a voltage, the light modulation device may maintain any one of the above-described states, and then may be switched to another state when a voltage is applied. The state of the mode may be changed or the third different mode state may also be implemented, by changing the intensity, frequency and/or shape of the applied voltage.

Figure 1:
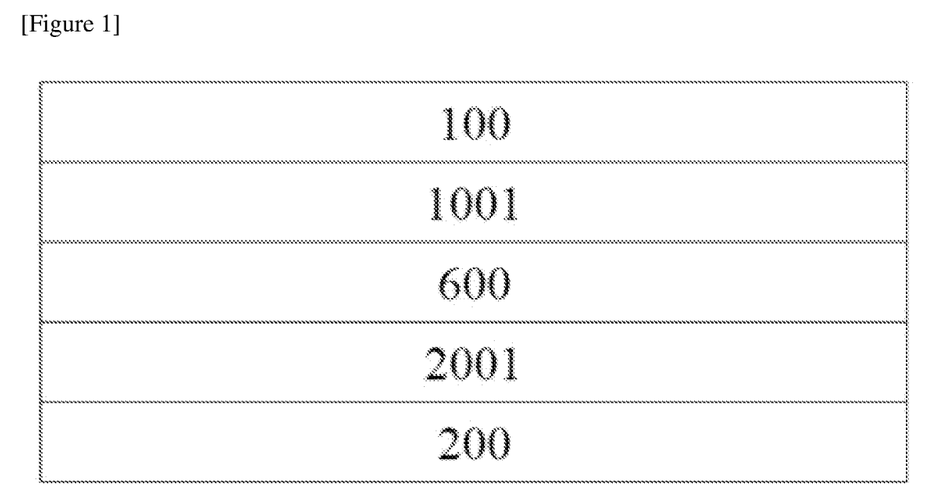
FIGS. 1 to 3 are schematic diagrams of exemplary light modulation devices of the present disclosure.

The light modulation device of the present disclosure may comprise, as a basic unit, a light modulation film layer having two substrates disposed opposite to each other and a light modulation layer positioned between the substrates. FIG. 1 is a diagram showing one example of the light modulation film layer. The light modulation film layer comprises a first substrate (100) and a second substrate (200) which are oppositely disposed. As shown in the drawing, in the light modulation device of the present disclosure, an adhesive layer may be formed on one surface of the first substrate (100) (hereinafter, may be referred to as a first surface), a liquid crystal alignment film (2001) may be formed on the surface of the other second substrate (200) (hereinafter, may be referred to as a first surface), and a light modulation layer (600) may be positioned between the oppositely disposed first substrate (100) and second substrate (200). When the light modulation layer is a liquid crystal layer, a liquid crystal alignment film is usually formed on both surfaces of the first and second substrates (100, 200), but and adhesive layer is formed on the first substrate (100) instead of the liquid crystal alignment film, and a liquid crystal alignment film is formed only on the second substrate (200), whereby the orientation state of the liquid crystal compound, which is very useful in a specific application (e.g., smart window or eyewear), can be obtained. In addition, such a structure makes it possible to quickly manufacture a light modulation device in which excellent adhesive force between the first and second substrates (100, 200) is secured when applied to the manufacturing process of the present disclosure to be described below. Therefore, a liquid crystal alignment film may not be formed on the first substrate of the light modulation film layer of the present disclosure. In addition, although not shown in the drawing, in any one of the first and second substrates of the light modulation film layer, a spacer for maintaining an interval (cell gap) between the first and second substrates is present. When the adhesive layer (1001) is formed on the substrate (100), the adhesive layer (1001)

is attached to the spacer, thereby being capable of greatly improving adhesive force between the first and second substrates.

In this specification, the first surface of the substrate means any one surface of the main surface of the substrate and the opposite surface, and the second surface means the other surface of the main surface of the substrate and the opposite surface.

As the substrate, a known substrate material may be used without particular limitation. For example, an inorganic substrate such as a glass substrate, a crystalline or amorphous silicon substrate or a quartz substrate, or a plastic substrate may be used as the substrate. However, for effective application to the manufacturing process of the present disclosure, a plastic substrate may be used as the substrate.

As the plastic substrate, a TAC (triacetyl cellulose) substrate; a COP (cycloolefin copolymer) substrate such as a norbornene derivative substrate; a PMMA (poly(methyl methacrylate)) substrate; a PC (polycarbonate) substrate; a PE (polyethylene) substrate; a PP (polypropylene) substrate; a PVA (polyvinyl alcohol) substrate; a DAC (diacetyl cellulose) substrate; a Pac (polyacrylate) substrate; a PES (poly ether sulfone) substrate; a PEEK (polyetheretherketon) substrate; a PPS (polyphenylsulfone), a PEI (polyetherimide) substrate; a PEN (polyethylenenaphthatlate) substrate; a polyester substrate such as a PET (polyethyleneterephtalate) substrate; a PI (polyimide) substrate; a PSF (polysulfone) substrate; a PAR (polyarylate) substrate or a fluororesin substrate, and the like may be used, without being limited thereto. The thickness of such a substrate is not particularly limited, which may be selected within an appropriate range.

The light modulation layer present between the substrates is a functional layer capable of changing light transmittance, reflectivity, haze and/or color, etc., alone or in connection with other components, depending on whether or not an external signal is applied. Such a light modulation layer may be referred to as an active light modulation layer herein.

In this specification, the external signal may mean an external factor, for example, an external voltage or the like, which may affect the behavior of a material included in the light modulation layer, for example, a light modulation material. Therefore, a state without any external signal may mean a state without the application of an external voltage or the like.

In the present disclosure, the type of the light modulation layer is not particularly limited as long as it has the above-described functions, and a known light modulation layer can be applied. The light modulation layer may be, for example, a liquid crystal layer, an electrochromic material layer, a photochromic material layer, an electrophoretic material layer, or a dispersed particle orientation layer.

In one example, the liquid crystal layer may be applied as the light modulation layer. The liquid crystal layer is a layer containing a liquid crystal compound. In this specification, the range of the term liquid crystal layer includes all layers containing a liquid crystal compound, and for example, as described below, a so-called guest host layer comprising a liquid crystal compound (liquid crystal host) and a dichroic dye, or a layer comprising other additives such as a chiral dopant together with a liquid crystal compound is also a kind of liquid crystal layer defined in this specification. The liquid crystal layer may be an active liquid crystal layer, and thus the liquid crystal compound may exist in the liquid crystal layer such that the orientation direction changes depending on whether or not an external signal is applied. As the liquid crystal compound, any kind of liquid crystal compound can be used as far as the orientation direction can be changed by application of an external signal. For example, a smectic liquid crystal compound, a nematic liquid crystal compound or a cholesteric liquid crystal compound can be used as the liquid crystal compound. Furthermore, the liquid crystal compound may be, for example, a compound which has no polymerizable group or crosslinkable group so that the orientation direction can be changed by application of an external signal.

The liquid crystal layer may comprise a liquid crystal compound whose dielectric constant anisotropy is positive or negative. The absolute value of the dielectric constant anisotropy of the liquid crystal can be appropriately selected in consideration of the object of the present disclosure. The term "dielectric constant anisotropy ($\Delta\varepsilon$)" may mean a difference ($\varepsilon//-\varepsilon\perp$) between the horizontal dielectric constant ($\varepsilon//$) and the vertical dielectric constant ($\varepsilon\perp$) of the liquid crystal. In this specification, the term horizontal dielectric constant ($\varepsilon//$) means a dielectric constant value measured along the direction of an electric field in a state where a voltage is applied so that the director of the liquid crystal and the direction of the electric field by the applied voltage are substantially horizontal, and the vertical dielectric constant ($\varepsilon\perp$) means a dielectric constant value measured along the direction of an electric field in a state where a voltage is applied so that the director of the liquid crystal and the direction of the electric field by the applied voltage are substantially perpendicular.

The driving mode of the liquid crystal layer may be exemplified by, for example, a DS (dynamic scattering) mode, an ECB (electrically controllable birefringence) mode, an IPS (in-plane switching) mode, an FFS (fringe-field switching) mode, an OCB (optically compensated bend) mode, a VA (vertical alignment) mode, an MVA (multi-domain vertical alignment) mode, a PVA (patterned vertical alignment) mode, an HAN (hybrid aligned nematic) mode, a TN (twisted nematic) mode, an STN (super twisted nematic) mode or R-TN (reversed twisted nematic) mode, and the like.

The light modulation layer, which is a liquid crystal layer, may further comprise a dichroic dye in terms of controlling light transmittance-variable characteristics together with the liquid crystal compound. In this specification, the term dye may mean a material capable of intensively absorbing and/or deforming light in at least a part or all of the ranges within a visible light region, for example, within a wavelength range of 400 nm to 700 nm, and the term dichroic dye may mean a material capable of anisotropic absorption of light in at least a part or all of the ranges of the visible light region. Such a dye is known, for example, as an azo dye or an anthraquinone dye, and the like, but is not limited thereto.

In one example, the light modulation layer is a liquid crystal layer comprising liquid crystal and dichroic dyes, which may be a so-called guest host liquid crystal layer (guest host liquid crystal cell). The term guest host liquid crystal layer is a liquid crystal layer that may also be referred to as a GHLC layer, which may mean a functional layer that dichroic dyes are arranged together depending on arrangement of liquid crystals to exhibit anisotropic light absorption characteristics with respect to an alignment direction of the dichroic dyes and the direction perpendicular to the alignment direction, respectively. For example, the dichroic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the dichroic dye is assumed to be a p-type dye.

The light modulation film layer comprising the guest host liquid crystal layer as the light modulation layer may function as an active polarization layer (active polarizer). In this specification, the term active polarization layer (active polarizer) may mean a functional element capable of controlling anisotropic light absorption depending on external signal application. Such an active polarization layer can be distinguished from a passive polarization layer, which is described below, having constant light absorption or light reflection characteristics regardless of the external signal application. The guest host liquid crystal layer can control the anisotropic light absorption for the polarized light in the direction parallel to the arrangement direction of dichroic dyes and the polarized light in the vertical direction by controlling the arrangement of liquid crystals and dichroic dyes. Since the arrangement of liquid crystals and dichroic dyes can be controlled by the application of the external signal such as a magnetic field or an electric field, the guest host liquid crystal layer can control anisotropic light absorption depending on the external signal application.

The liquid crystal layer, which is a light modulation layer, may also comprise a so-called chiral dopant together with the liquid crystal compound. Such a chiral dopant may induce orientation of a helical structure in the liquid crystal compound. The type of the chiral dopant that may be included is not particularly limited, and an appropriate chiral dopant may be selected from known types as needed. Also, the ratio of the chiral dopant is not particularly limited, but the chiral dopant may be included in a ratio that the ratio (d/p) of the thickness (d, cell gap) of the light modulation layer and the pitch (p) of the helical structure of the liquid crystal compound generated by the addition of the chiral dopant may be less than 1. In another example, the ratio (d/p) may be 0.95 or less, 0.9 or less, 0.85 or less, 0.8 or less, 0.75 or less, 0.7 or less, 0.65 or less, 0.6 or less, 0.55 or less, 0.5 or less, or 0.45 or less, or may be 0.05 or more, 0.1 or more, 0.15 or more, 0.2 or more, 0.25 or more, 0.3 or more, or 0.35 or more. Such a ratio (d/p) is linked to the orientation of the liquid crystal compound induced by the adhesive layer and the liquid crystal alignment film, so that an orientation state suitable for the applied use can be derived.

The thickness of the light modulation layer (cell gap) may be appropriately selected in consideration of the purpose of the present disclosure. In one example, the thickness of the light modulation layer may be 0.01 μm or more, 0.1 μm or more, 1 μm or more, 2 μm or more, 3 μm or more, 4 μm or more, 5 μm or more, 6 μm or more, 7 μm or more, 8 μm or more, 9 μm or more, or 10 μm or more. A device having a large difference in transmittance, reflectance, haze, and/or color according to the mode state in such a thickness can be implemented. The thicker the thickness, the difference can be realized, so that it is not particularly limited, but it may be generally about 30 μm or less, 25 μm or less, 20 μm or less, or 15 μm or less.

In the light modulation film layer, the type of adhesive layer formed on the first surface of the first substrate is not particularly limited. The adhesive layer can be a pressure-sensitive adhesive layer. Various types of pressure-sensitive adhesives or adhesives known as a so-called OCA (optically clear adhesive) or OCR (optically clear resin) in the industry may induce suitable orientation of the liquid crystal compound in combination with the liquid crystal alignment film.

As the pressure-sensitive adhesive or adhesive, for example, an acrylic, silicone-based, epoxy-based, or urethane-based pressure-sensitive adhesive or adhesive may be applied.

As the suitable pressure-sensitive adhesive or adhesive, a silicone-based pressure-sensitive adhesive or adhesive may be exemplified. The specific surface characteristics of the silicone-based pressure-sensitive adhesive or adhesive may induce the orientation state of the liquid crystal compound suitable for the purpose in combination with the liquid crystal alignment film (especially, vertical alignment film).

As the silicone-based pressure-sensitive adhesive or adhesive, a cured product of a curable silicone adhesive or pressure-sensitive adhesive composition (hereinafter, may be simply referred to as a curable silicone composition) may be used. The type of curable silicone composition is not particularly limited, and for example, a heat-curable silicone composition or an ultraviolet-curable silicone composition may be used.

In one example, the curable silicone composition is an addition-curable silicone composition, which may comprise (1) an organopolysiloxane containing two or more alkenyl groups in the molecule, and (2) an organopolysiloxane containing two or more silicon-bonded hydrogen atoms in the molecule. Such a silicone compound may form a cured product by an addition reaction, for example, in the presence of a catalyst such as a platinum catalyst.

The (1) organopolysiloxane comprises, as a main component constituting the silicone cured product, at least two alkenyl groups in one molecule. At this time, a specific example of the alkenyl group includes a vinyl group, an allyl group, a butenyl group, a pentenyl group, a hexenyl group or a heptenyl group, and the like, and a vinyl group of the foregoing is usually applied, but is not limited thereto. In the (1) organopolysiloxane, the bonding position of the alkenyl group as described above is not particularly limited. For example, the alkenyl group may be bonded to the end of the molecular chain and/or to the side chain of the molecular chain. In addition, in the (1) organopolysiloxane, the type of the substituent that may be included in addition to the above-described alkenyl may include an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like, and a methyl group or a phenyl group of the foregoing is usually applied, but is not limited thereto.

The molecular structure of the (1) organopolysiloxane is not particularly limited, which may also have any shape, such as linear, branched, cyclic, reticulated or linear with partially branched. One having a linear molecular structure among such molecular structures is usually applied, but is not limited thereto.

A more specific example of the (1) organopolysiloxane may include a dimethylsiloxane-methylvinylsiloxane copolymer blocking with trimethylsiloxane groups at both ends of the molecular chain, a methylvinylpolysiloxane blocking with trimethylsiloxane groups at both ends of the molecular chain, a dimethylsiloxane-methylvinylsiloxane-methylphenylsiloxane copolymer blocking with trimethylsiloxane groups at both ends of the molecular chain, a dimethylpolysiloxane blocking with dimethylvinylsiloxane groups at both ends of the molecular chain, a methyl vinylpolysiloxane blocking with dimethylvinylsiloxane groups at both ends of the molecular chain, a dimethylsiloxane-methylvinylsiloxane copolymer blocking with dimethylvinylsiloxane groups at both ends of the molecular chain, a dimethylsiloxane-methylvinylsiloxane-methylphenylsiloxane copolymer blocking with dimethylvinylsiloxane groups at both ends of the molecular chain, an organopolysiloxane copolymer comprising a siloxane unit represented by $R^1{}_2SiO_{2/2}$ and a siloxane unit represented by $R^1{}_2R^2SiO_{1/2}$ and a siloxane unit represented by $SiO_{4/2}$, an organopolysiloxane copolymer comprising a siloxane unit represented by $R^1{}_2R^2SiO_{1/2}$ and a siloxane unit represented by $SiO_{4/2}$, an organopolysiloxane copolymer comprising a siloxane unit represented by $R^1R^2SiO_{2/2}$ and a siloxane unit represented by $R^1SiO_{3/2}$ or a siloxane unit represented by $R^2SiO_{3/2}$, and a mixture of two or more of the foregoing, but is not limited thereto. Here, $R^1$ is a hydrocarbon group other than an alkenyl group, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group, or a 3,3,3-trifluoropropyl group, and the like. In addition, here, $R^2$ is an alkenyl group, which may be, specifically, a vinyl group, an allyl group, a butenyl group, a pentenyl group, a hexenyl group or a heptenyl group, and the like.

In the addition-curable silicone composition, the (2) organopolysiloxane may serve to crosslink the (1) organopolysiloxane. In the (2) organopolysiloxane, the bonding position of the hydrogen atom is not particularly limited, which may be, for example, bonded to the end and/or side chain of the molecular chain. Also, in the (2) organopolysiloxane, the kind of substituents that may be included in addition to the silicon-bonded hydrogen atom is not particularly limited, which may include, for example, an alkyl group, an aryl group, an aralkyl group or a halogen-substituted alkyl group, and the like as mentioned in the (1) organopolysiloxane, and among these, a methyl group or a phenyl group is usually applied, but is not limited thereto.

The molecular structure of the (2) organopolysiloxane is not particularly limited, and may also have any shape, such as linear, branched, cyclic, reticulated, or linear with partially branched. One having a linear molecular structure among such molecular structures is usually applied, but is not limited thereto.

A more specific example of the (2) organopolysiloxane may include a methylhydrogenpolysiloxane blocking with trimethylsiloxane groups at both ends of the molecular chain, a dimethylsiloxane-methylhydrogen copolymer blocking with trimethylsiloxane groups at both ends of the molecular chain, a dimethylsiloxane-methylhydrogensiloxane-methylphenylsiloxane copolymer blocking with trimethylsiloxane groups at both ends of the molecular chain, a dimethylpolysiloxane blocking with dimethylhydrogensiloxane groups at both ends of the molecular chain, a dimethylsiloxane-methylphenylsiloxane copolymer blocking with dimethylhydrogensiloxane groups at both ends of the molecular chain, a methylphenylpolysiloxane blocking with dimethylhydrogensiloxane groups at both ends of the molecular chain, an organopolysiloxane copolymer comprising a siloxane unit represented by $R^1{}_3SiO_{1/2}$, a siloxane unit represented by $R^1{}_2HSiO_{1/2}$ and a siloxane unit represented by $SiO_{4/2}$, an organopolysiloxane copolymer comprising a siloxane unit represented by $R^1{}_2HSiO_{1/2}$ and a siloxane unit represented by $SiO_{4/2}$, an organopolysiloxane copolymer comprising a siloxane unit represented by $R^1HSiO_{2/2}$ and a siloxane unit represented by $R^1SiO_{3/2}$ or a siloxane unit represented by $HSiO_{3/2}$ and a mixture of two or more of the foregoing, but is not limited thereto. Here, $R^1$ is a hydrocarbon group other than an alkenyl group, which may be, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like.

The content of the (2) organopolysiloxane is not particularly limited as long as it is included to the extent that appropriate curing can be performed. For example, the (2) organopolysiloxane may be contained in an amount of 0.5 to 10 silicon-bonded hydrogen atoms per one alkenyl group contained in the (1) organopolysiloxane as described above. In such a range, curing can be sufficiently performed and heat resistance can be secured.

The addition-curable silicone composition may further comprise platinum or a platinum compound as a catalyst for curing. The specific type of this platinum or platinum compound is not particularly limited. The ratio of the catalyst may also be adjusted to a level that proper curing may be performed.

The addition-curable silicone composition may also comprise an appropriate additive required from the viewpoint of improving storage stability, handling properties and workability in an appropriate ratio.

In another example, the silicone composition may comprise, as a condensation-curable silicone composition, for example, (a) an alkoxy group-containing siloxane polymer; and (b) a hydroxyl group-containing siloxane polymer.

The (a) siloxane polymer may be, for example, a compound represented by Formula 1 below.

$$R^1{}_aR^2{}_bSiO_c(OR^3)_d \qquad \text{[Formula 1]}$$

In Formula 1, $R^1$ and $R^2$ each independently represent a hydrogen atom or a substituted or unsubstituted monovalent hydrocarbon group, $R^3$ represents an alkyl group, where when a plurality of $R^1$, $R^2$ and $R^3$ are present, they each may be the same or different from each other, and a and b each independently represent a number of 0 or more and less than 1, a+b represents a number of more than 0 and less than 2, c represents a number of more than 0 and less than 2, d represents a number of more than 0 and less than 4, and a+b+c×2+d is 4.

In the definition of Formula 1, the monovalent hydrocarbon group may be, for example, an alkyl group having 1 to 8 carbon atoms, a phenyl group, a benzyl group or a tolyl group, and the like, where the alkyl group having 1 to 8 carbon atoms may be a methyl group, an ethyl group, a propyl group, an isopropyl group, a butyl group, a pentyl group, a hexyl group, a heptyl group or an octyl group, and the like. Also, in the definition of Formula 1, the monovalent hydrocarbon group may be substituted with a known substituent such as a halogen, an amino group, a mercapto group, an isocyanate group, a glycidyl group, a glycidoxy group or a ureido group.

In the definition of Formula 1, an example of the alkyl group of $R^3$ may include a methyl group, an ethyl group, a propyl group, an isopropyl group or a butyl group, and the like. Among these alkyl groups, a methyl group or an ethyl group, and the like is usually applied, but is not limited thereto.

Among the polymers of Formula 1, a branched or tertiary crosslinked siloxane polymer may be used. Furthermore, in this (a) siloxane polymer, a hydroxyl group may remain within a range that does not impair the object, specifically within a range that does not inhibit the dealcoholization reaction.

The (a) siloxane polymer may be produced, for example, by hydrolyzing and condensing a polyfunctional alkoxysilane or a polyfunctional chlorosilane, and the like. An average technician in this field can easily select an appropriate polyfunctional alkoxysilane or chlorosilane depending on the desired (a) siloxane polymer, and can also easily control the conditions of the hydrolysis and condensation reactions using the same. Meanwhile, in the production of the (a) siloxane polymer, an appropriate monofunctional alkoxy silane may also be used in combination depending on the purpose.

As the (a) siloxane polymer, for example, a commercially available organosiloxane polymer such as Shin-Etsu Silicone's X40-9220 or X40-9225, or GE Toray Silicone's XR31-B1410, XR31-B0270 or XR31-B2733 may be used.

As the (b) hydroxyl group-containing siloxane polymer contained in the condensation-curable silicone composition, for example, a compound represented by the following formula 2 may be used.

[Formula 2]

In Formula 2, $R_4$ and $R_5$ each independently represent a hydrogen atom or a substituted or unsubstituted monovalent hydrocarbon group, where when a plurality of $R_4$ and $R_5$ are present, they may be the same or different from each other, and n represents an integer of 5 to 2,000.

In the definition of Formula 2, the specific type of the monovalent hydrocarbon group may include, for example, the same hydrocarbon group as the case of Formula 1 above.

The (b) siloxane polymer may be produced, for example, by hydrolyzing and condensing dialkoxysilane and/or dichlorosilane, and the like. An average technician in this field can easily select an appropriate dialkoxysilane or dichlorosilane according to the desired (b) siloxane polymer, and can also easily control the conditions of the hydrolysis and condensation reactions using the same. As the (b) siloxane polymer as above, a commercially available bifunctional organosiloxane polymer, such as GE Toray Silicone's XC96-723, YF-3800 or YF-3804, and the like may be used.

The above-described addition-curing or condensation-curing silicone composition is an example of a material for forming the silicone pressure-sensitive adhesive or adhesive applied in the present disclosure. That is, basically, all silicone pressure-sensitive adhesives or adhesives known as OCA or OCR, and the like in the industry can be applied in the present disclosure.

The type of the pressure-sensitive adhesive or adhesive or the curable composition forming the same is not particularly limited, which may be appropriately selected according to the intended use. For example, a solid, semi-solid or liquid pressure-sensitive adhesive or adhesive or curable composition may be used. The solid or semi-solid pressure-sensitive adhesive or adhesive or curable composition may be cured before the adhesion object is bonded. The liquid pressure-sensitive adhesive or adhesive or curable composition is referred to as a so-called optical clear resin (OCR), which may be cured after the adhesion object is bonded. According to one example, as the pressure-sensitive adhesive or adhesive or curable composition, a so-called polydimethyl siloxane-based pressure-sensitive adhesive or adhesive or curable composition or polymethylvinyl siloxane-based pressure-sensitive adhesive or adhesive or curable composition or alkoxysilicone-based pressure-sensitive adhesive or adhesive or curable composition may be used, without being limited thereto.

The thickness of the adhesive layer is not particularly limited, which may be selected in an appropriate range for securing a desired adhesion or cohesion. The thickness may be in the range of approximately 1 μm to 50 μm. In another example, the thickness may be 2 μm or more, 3 μm or more, 4 μm or more, 5 μm or more, 6 μm or more, 7 μm or more, 8 μm or more, 9 μm or more, or 10 μm or more, or may also be 45 μm or less, 40 μm or less, 35 μm or less, 30 μm or less, 25 μm or less, 20 μm or less, 15 μm or less, or 10 μm or less or so.

Also, the kind of the alignment film formed on the first surface of the second substrate is not particularly limited. That is, as the alignment film, a known vertical or horizontal alignment film or other alignment film may be applied in consideration of desired initial orientation. As for the type of the alignment film, a contact alignment film such as a rubbing alignment film or a non-contact alignment film such as a photo alignment film may be applied. In one example, a vertical alignment film may be used as the alignment film. The combination of the vertical alignment film and the adhesive layer may induce an orientation state of a liquid crystal compound suitable for various uses.

The initial orientation of the liquid crystal compound formed by the adhesive layer and the liquid crystal alignment film in the liquid crystal layer, which is a light modulation layer, may be vertical orientation, horizontal orientation, oblique orientation or spray orientation. Also, in the vertical orientation, horizontal orientation, oblique orientation or spray orientation state, the liquid crystal compound may or may not be twisted to exist in twisting orientation or cholesteric orientation. Here, the initial orientation means orientation in a state where an external signal such as a voltage is not applied to the light modulation layer comprising the liquid crystal compound.

The meaning of the horizontal orientation, oblique orientation, vertical orientation or spray orientation is as known in the art. While the liquid crystal compound of the light modulation layer maintains the horizontal orientation, oblique orientation, vertical orientation or spray orientation state in the initial state, it can be changed to the other orientation states according to an external signal.

In one example, the initial orientation of the liquid crystal compound in the light modulation layer may be vertical orientation or an orientation state similar to the vertical orientation. This orientation state is obtained by applying a vertical alignment film as the liquid crystal alignment film. This orientation is useful in an element that implements a so-called R-TN (reversed twisted nematic) orientation.

In addition, when the liquid crystal alignment film is a horizontal alignment film, it is useful in an element implementing a so-called ECB mode.

Therefore, the planar phase difference (based on a wavelength of 550 nm) of the light modulation layer in the vertical orientation or an orientation state similar to the vertical orientation may be, for example, about 30 nm or less, 25 nm or less, 20 nm or less, 15 nm or less, 10 nm or less, or 5 nm or less, or may be 0 nm or more, or more than 0 nm.

The planar phase difference (or in-plane phase difference) may be obtained according to Equation 1 below.

$$Rin = d \times (nx - ny) \quad \text{[Equation 1]}$$

In Equation 1, Rin is a planar phase difference or in-plane phase difference, nx is the slow axis direction refractive index of the liquid crystal compound in the light modulation layer, ny is the fast axis direction refractive index of the liquid crystal compound in the light modulation layer, and d is the thickness of the light modulation layer.

The light modulation film layer may further comprise a spacer for maintaining an interval between the first and second substrates. As the spacer, a ball spacer, a column spacer or a partition spacer, which is a spacer that is commonly applied, may be applied. As the partition spacer, a honeycomb-shaped or tetragon-shaped partition spacer, or a random spacer may be applied. Here, when the shape of the partition spacer formed on the substrate is observed from the normal direction of the substrate, the honeycomb-shaped or tetragon-shaped partition spacer means the case where the figure formed by the partition spacer is a honeycomb type or a tetragon type, as is well-known. The honeycomb type is usually a combination of regular hexagons, and in the case of the tetragon type, there may be a square, a rectangle, or a combination of a square and a rectangle, and the like. In addition, here, the random spacer means a case where the partitions are arranged at random, wherein the relevant partitions do not form a figure, or form a figure at random rather than a standard figure, even if it is formed.

The pitch of the spacer may also be appropriately selected in consideration of the desired adhesion or cell gap maintaining efficiency, and the like. For example, when the partition spacer is applied, the pitch of the partition spacer may be in a range of 300 μm to 900 μm. In another example, the pitch may be 350 μm or more, 400 μm or more, 450 μm or more, 500 μm or more, or 550 μm or more, or may also be 850 μm or less, 800 μm or less, 750 μm or less, 700 μm or less, 650 μm or less, or 600 μm or less or so. The method of obtaining the pitch in the partition spacer is known. For example, if the partition spacer is a honeycomb type, the pitch is obtained through the interval of opposite sides in the hexagon forming the honeycomb, and in the case of a tetragon, the pitch is obtained through the length of the sides of the tetragon. In the case where the intervals of the sides facing each other in the hexagon forming the honeycomb or the lengths of the sides of the tetragon are not constant, an average value of them may be defined as the pitch.

Meanwhile, the line width of the partition spacer, for example, the width of each wall of the hexagon forming the honeycomb, or the tetragon, may be in a range of, for example, about 5 μm to 50 μm. In another example, the line width may be about 10 μm or more, or 15 μm or more, or may also be 45 μm or less, 40 μm or less, 35 μm or less, 30 μm or less, 25 μm or less, or 20 μm or less or so.

In the above range, the cell gap may be properly maintained, and adhesion between substrates may also be maintained excellently.

A method of forming the ball spacer, column spacer or partition spacer as above between substrates is known.

As a component for applying an external signal to the light modulation layer, an electrode layer may be formed on each substrate of the light modulation film layer. For example, the electrode layer may be present between the first surface and the adhesive layer in the first substrate (between 100 and 1001 in FIG. 1) and/or between the first surface and the alignment film in the second substrate (between 200 and 2001 in FIG. 1) (if a spacer is present, between the spacer and the alignment film). In the case of the second substrate, it is common that first, an electrode layer is formed on the first surface, and a spacer and an alignment film are formed thereon sequentially, so that when a spacer is present, the electrode layer may be located between the first surface of the second substrate and the spacer and alignment film.

As the electrode layer, a known transparent electrode layer may be applied, and for example, a so-called conductive polymer layer, a conductive metal layer, a conductive nanowire layer, or a metal oxide layer such as ITO (indium tin oxide) may be used as the electrode layer. Besides, various materials and forming methods capable of forming a transparent electrode layer are known, which can be applied without limitation.

The light modulation device may comprise other additional constitutions as necessary, while basically comprising the light modulation film layer. That is, depending on the driving mode, the implementation of the above-described transparent, black, high reflection and/or low reflection mode and switching between them are possible even with the light modulation film layer alone, but in order to facilitate the implementation or switching of these modes, it is also possible to include additional components.

Figure 2:
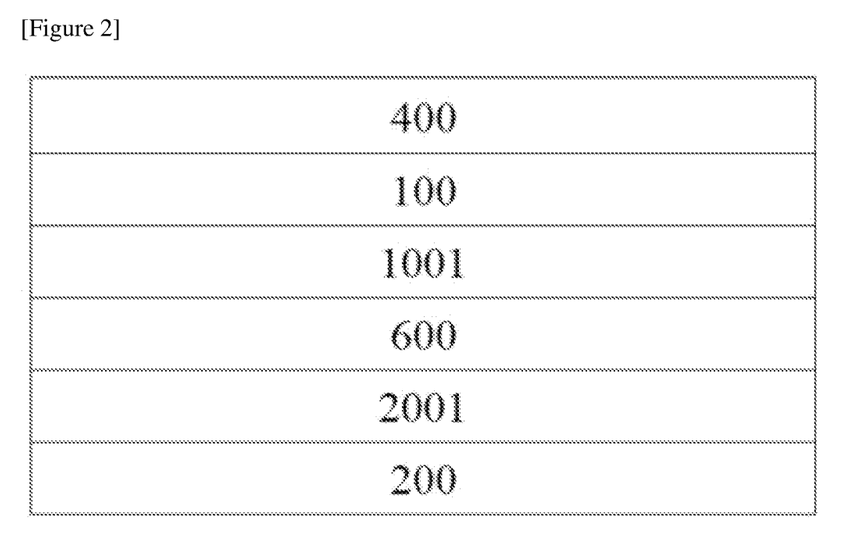
Figure 3:
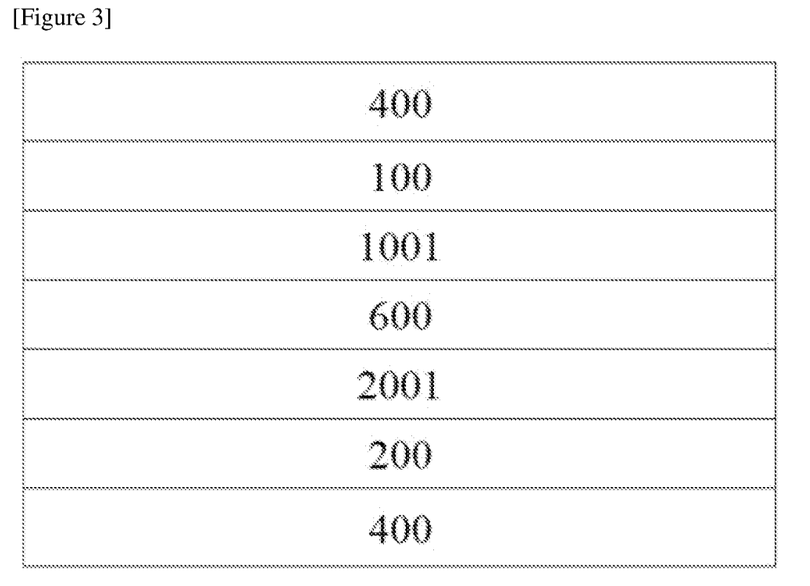

For example, the device may further comprise a polarization layer (passive polarization layer) disposed on one side or both sides of the light modulation film layer. FIG. 2 is, as an example of the above structure, the case where in the structure of FIG. 1, the polarization layer (400) is disposed only on one side of the light modulation film layer, and FIG. 3 is the case where in the structure of FIG. 1, the polarization layer (400) is disposed on both sides of the light modulation film layer. In addition, when the partition spacer is applied as the spacer and the shape is a tetragon (square or rectangle), the sides of the tetragon and the absorption axis of the polarization layer are suitably disposed to be substantially vertical or horizontal to each other.

The term polarization layer may mean an element that converts natural light or unpolarized light into polarized light. In one example, the polarization layer may be a linear polarization layer. The linear polarization layer means a case where the selectively transmitting light is linearly polarized light that vibrates in any one direction and the selectively absorbing or reflecting light is linearly polarized light that vibrates in directions orthogonal to the vibration direction of the linearly polarized light. That is, the linear polarization layer may have a transmission axis and absorption axes or reflection axes orthogonal to each other in the plane direction.

The polarization layer may be an absorptive polarization layer or a reflective polarization layer. As the absorptive polarization layer, for example, a polarization layer in which iodine is dyed to a polymer stretched film such as a PVA stretched film, or a guest-host polarization layer in which liquid crystals polymerized in an oriented state are used as a host and dichroic dyes arranged along the orientation of the liquid crystals are used as a guest may be used, without being limited thereto.

As the reflective polarization layer, for example, a reflective polarization layer known as a so-called DBEF (dual brightness enhancement film) or a reflective polarization layer formed by coating a liquid crystal compound such as LLC (lyotropic liquid crystal) may be used, but is not limited thereto.

As shown in FIG. 3, it may have a structure in which the polarization layers are disposed on both sides of the light modulation film layer. In this case, the angle formed by the transmission axes of the polarization layers disposed on both sides may be in the range of 85 degrees to 95 degrees, or approximately perpendicular.

The light modulation device may comprise other necessary constitutions in addition to the above constitutions. For example, any other constitution necessary for driving or using the light modulation device, such as an adhesive layer for attaching other components in addition to the adhesive layer formed on the first surface of the first substrate, a hard coating film, an antireflection film and/or an NIR (near-infrared) cut layer, may be added.

The light modulation device of the present disclosure can be applied to various applications. The applications to which the light modulation device can be applied can be exemplified by openings in enclosed spaces including buildings, containers or vehicles, and the like, such as windows or sunroofs, or eyewear, and the like. Here, in the range of eyewear, all eyewear formed so that an observer can observe the outside through lenses, such as general glasses, sunglasses, sports goggles or helmets, or instruments for experiencing augmented reality, can be included.

The present disclosure relates to a method for manufacturing the light modulation device. In the present disclosure, the light modulation device is manufactured by applying a roll-to-roll process.

In one example, the manufacturing method of the present disclosure may comprise a step of attaching a first substrate in which an adhesive layer is formed on the first surface and a second substrate in which a spacer and a liquid crystal alignment film are formed on the first surface so that the respective first surfaces face each other.

The contents of the first and second substrates and the matters of the adhesive layer, the spacer and the liquid crystal alignment film formed on their respective first surfaces are the same as described above. In addition, as described above, an electrode layer may be present between the first surface of the first substrate and the adhesive layer and/or between the first surface of the second substrate and the liquid crystal alignment film and/or spacer. For example, the second substrate may have a structure in which the electrode layer, the spacer and the liquid crystal alignment film are formed on the first surface in this order.

The attachment of the first and second substrates may be performed while transferring each substrate by a roll.

In addition, the attachment may be performed so that the adhesive layer on the first surface of the first substrate and the spacer and/or the liquid crystal alignment film on the first surface of the second substrate contact physically.

Figure 4:
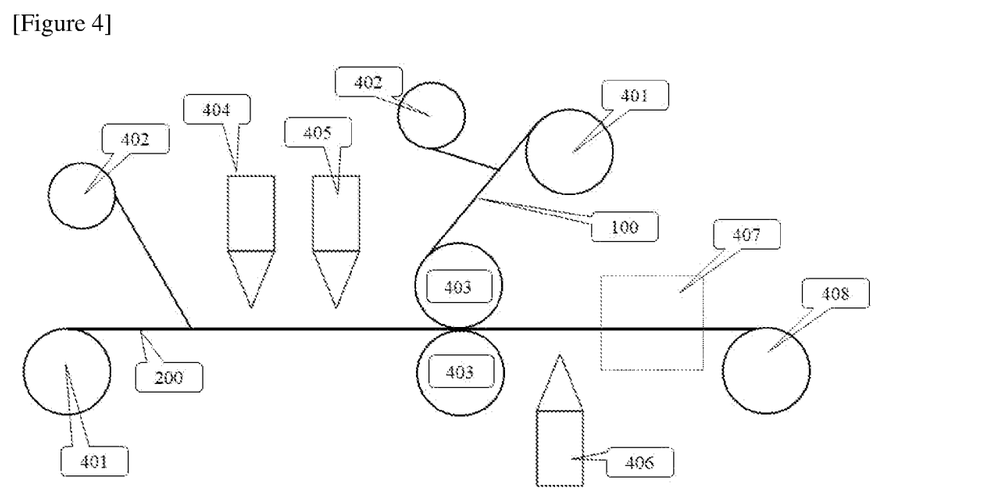
FIG. 4 is a schematic diagram showing that a manufacturing process of the light modulation device of the present disclosure is performed.

FIG. 4 is a view schematically illustrating a process in which the roll-to-roll process is performed.

As shown in the drawing, the transfer of the first and second substrates (100, 200) by the roll may be performed while unwinding the first and second substrates (100, 200) wound on unwind rolls (401), respectively, from the unwind rolls (401).

In one example, the first substrate may further comprise a release film attached to the adhesive layer in order to protect the adhesive layer formed on the first surface until the manufacturing process of the light modulation device. In this case, the first substrate to which the release film is attached may be wound on the unwind roll. At this time, the type of the applicable release film is not particularly limited. In this case, a step of peeling the release film before attachment of the first and second substrates may be further performed. The peeling method of the release film is not particularly limited. For example, as shown in FIG. 4, the release film may be peeled off using a peel roll (402) before attachment of the first and second substrates.

In order to protect the spacer and the liquid crystal aligning film formed on the first surface of the second substrate, a protective film attached on the liquid crystal alignment film (first surface) may be further formed. Even in this case, the specific kind of the protective film is not particularly limited. In addition, even in this case, the step of peeling the protective film may be further performed before attachment of the first and second substrates. The peeling of the protective film may also be performed using an appropriate peel roll (402).

The attachment of the first and second substrates may be performed, for example, while passing the laminate of the first and second substrates between two attachment rolls (403), as shown in FIG. 4. By attaching the first substrate in which the adhesive layer is formed on the first surface and the second substrate in which the partition wall spacer is formed on the first surface in this way, the adhesive force between the substrates can be maintained very well, and the manufacturing process of the light modulation device may be completed quickly in a short time.

If necessary, a step of supplying a sealant to the edge of the first surface of the second substrate before attachment of the first and second substrates may be further performed. Such a process may be performed, for example, by locating a sealant supply part (404) at an appropriate position along the travel path of the second substrate (200) to be transferred by the roll, as shown in FIG. 4. At this time, the type and application form of the applied sealant are not particularly limited. For example, it is possible to use a curable sealant material applied to the production of a known liquid crystal device. When the sealant is supplied in this way during performing the process and the curing process of the sealant is performed at an appropriate time after attaching the substrates, it is possible to form a light modulation device having better adhesive force between the substrates. When the sealant is supplied, a process of curing the sealant may also be further performed by passing the attached substrates (100, 200) through a curing part (406), which cures the sealant, after attachment of the first and second substrates (100, 200), as shown in FIG. 4. The shape of the sealant curing part (406) may be selected in consideration of the type of the applied sealant, and for example, a light irradiating device irradiating the sealant with suitable light or a heat application device applying heat to the sealant may be applied.

In the manufacturing method of the present disclosure, a step of supplying a light modulation material to the first surface of the second substrate before attachment of the first and second substrates may be further performed. When the step of supplying the sealant is performed, the supply of the light modulation material may be performed before or after the supply of the sealant, or may also be performed simultaneously with the supply of the sealant.

In the case of FIG. 4, it is an example of supplying the light modulation material using the light modulation material supply device (405) after the supply of the sealant.

A specific kind of the light modulation material is not particularly limited. For example, the light modulation material may be a liquid crystal compound, a mixture of a liquid crystal compound and a dichroic dye, a mixture of a liquid crystal compound and a chiral dopant, or a mixture of a liquid crystal compound, a dichroic dye and a chiral dopant, as described above.

Therefore, the manufacturing process may further perform a step of supplying a liquid crystal compound; or a liquid crystal compound and a dichroic dye; or a liquid crystal compound and a chiral dopant to the first surface of the second substrate before attachment of the first and second substrates.

Here, when a material comprising a chiral dopant is supplied as the light modulation material, the distance (d) between the first and second substrates during the attachment process may be adjusted so that the ratio (d/p) of the distance (d) to the chiral pitch (p) formed by the chiral dopant is within the above-described range.

As described above, the spacer formed on the first surface of the second substrate in the above process may be a partition wall spacer. Through the use of such a partition wall spacer, a light modulation device having excellent adhesive force between the substrates may be manufactured.

The manufacturing method of the present disclosure may perform a step of applying appropriate heat to the or adhesive layer formed on the first substrate at an appropriate time.

That is, when the adhesive layer is formed on the first surface of the first substrate and is attached with the spacer or liquid crystal alignment film on the first surface of the second substrate to constitute a light modulation device, the above-described excellent adhesive force can be achieved, but due to the particular surface properties of the adhesive and surface damage caused by the applied shear force or the like in the roll-to-roll manufacturing process, irregularities due to liquid crystal orientation abnormality may occur. Therefore, the orientation irregularities can be prevented by performing the heat treatment at an appropriate time in the process.

For example, the manufacturing process may further perform a step of heat-treating the first substrate before attachment of the first and second substrates.

The heat treatment may be performed at an appropriate temperature for a predetermined time. For example, the heat treatment may be performed at a temperature of about 80° C. or higher. In another example, the heat treatment may be performed at about 85° C. or more, about 90° C. or more, about 95° C. or more, or about 100° C. or more, or may also be performed at about 200° C. or less, 190° C. or less, 180° C. or less, 170° C. or less, 160° C. or less, 150° C. or less, 140° C. or less, 130° C. or less, 120° C. or less, or 110° C. or less or so.

In addition, the heat treatment may be performed for about 30 seconds or more, 60 seconds or more, 90 seconds or more, 120 seconds or more, 150 seconds or more, 180 seconds or more, 210 seconds or more, 240 seconds or more, 270 seconds or more, or 300 seconds or more, or may be performed for a time of about 20 minutes or less, 18 minutes or less, 16 minutes or less, 14 minutes or less, 12 minutes or less, 10 minutes or less, 8 minutes or less, or 6 minutes or less or so.

In one example, when a release film is attached to the adhesive layer, the heat treatment may be performed before or after peeling the release film.

In another example, the heat treatment may also be performed in the process of attaching the first and second substrates. In this case, the attachment of the first and second substrates may be performed within a temperature range of more than 50° C. and less than 90° C.

In another example, the attachment process may also be performed within a range of about 51° C. or more, 52° C. or more, 53° C. or more, 54° C. or more, 55° C. or more, about 56° C. or more, about 57° C. or more, about 58° C. or more, about 59° C. or more, or about 60° C. or more and/or within a range of less than about 90° C., about 89° C. or less, 88° C. or less, 87° C. or less, 86° C. or less, 85° C. or less, 84° C. or less, 83° C. or less, 82° C. or less, 81° C. or less, or 80° C. or less.

In another example, the heat treatment may also be performed after attaching the first and second substrates. In this case, the manufacturing method of the present disclosure may further comprise a step of heat-treating the first and second substrates attached after attachment of the first and second substrates.

The heat treatment may be performed at an appropriate temperature for a predetermined time. For example, the heat treatment may be performed at a temperature of about 60° C. or more. In another example, the heat treatment may be performed at about 65° C. or more, about 70° C. or more, 75° C. or more, 80° C. or more, about 85° C. or more, about 90° C. or more, about 95° C. or more, or about 100° C. or more, or may also be performed about 200° C. or less, 190° C. or less, 180° C. or less, 170° C. or less, 160° C. or less, 150° C. or less, 140° C. or less, 130° C. or less, 120° C. or less, or 110° C. or less or so. In addition, the heat treatment may be performed for about 30 seconds or more, 60 seconds or more, 90 seconds or more, 120 seconds or more, 150 seconds or more, 180 seconds or more, 210 seconds or more, 240 seconds or more, 270 seconds or more, or 300 seconds or more, or may be performed for a time of 20 minutes or less, 18 minutes or less, 16 minutes or less, 14 minutes or less, 12 minutes or less, 10 minutes or less, 8 minutes or less, or 6 minutes or less or so.

Through the heat treatment as described above, it is possible to solve the problem in which irregularities occur due to liquid crystal alignment abnormality caused by the particular surface characteristics of the adhesive and the surface damage caused by shear force or the like applied in the roll-to-roll manufacturing process.

Figure 5:
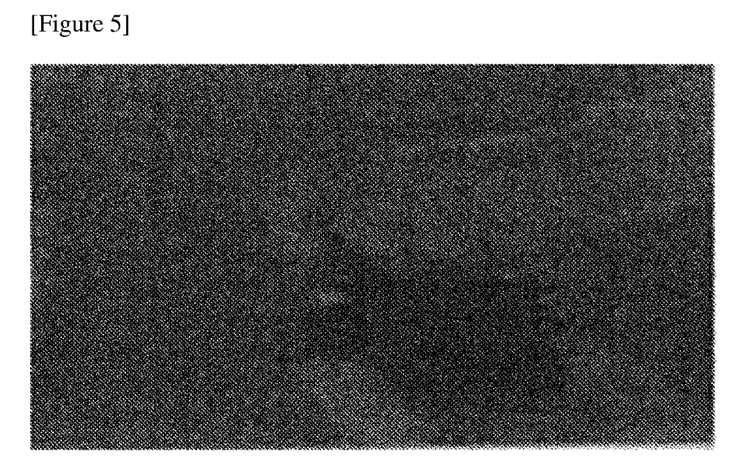
FIGS. 5 and 6 are photographs showing the presence or absence of orientation defects according to whether heat treatment is performed on the first substrate.
Figure 6:
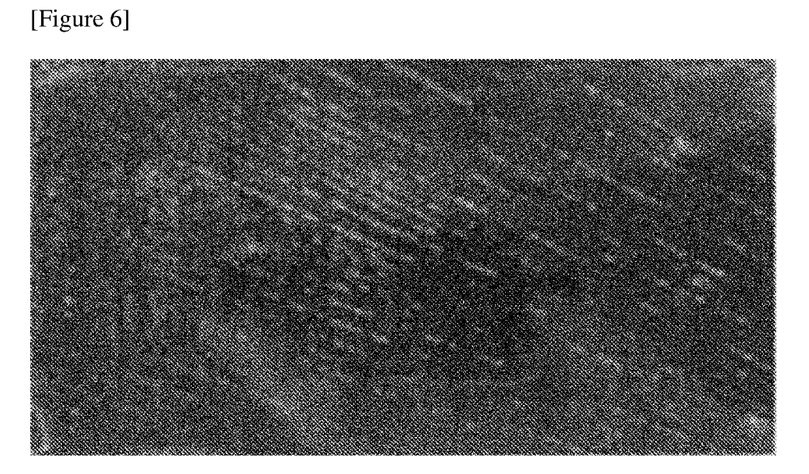

FIG. 5 is the result of observing the orientation irregularities when the heat treatment to maintain the first substrate, from which the release film is peeled off, at about 100° C. for about 5 minutes or so is performed before attachment of the first and second substrates in the process of manufacturing the light modulation device by applying the method of the present disclosure, and FIG. 6 is a view showing the result of observing the orientation irregularities of the light modulation device manufactured in the same manner except that the heat treatment is not performed. Through the comparison of FIGS. 5 and 6, it can be confirmed that the orientation irregularities can be greatly improved by the heat treatment.

Figure 7:
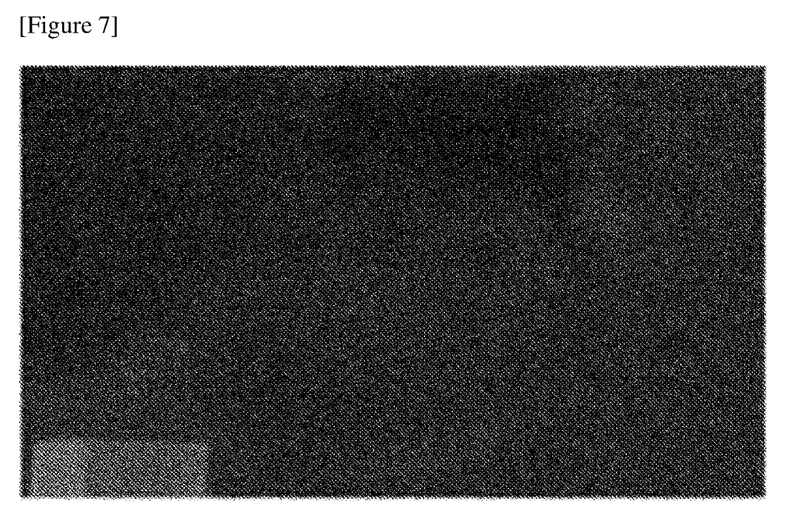
FIG. 7 is a view showing a result at the time of performing heat treatment in the attaching process of the first and second substrates.

FIG. 7 is the result of observing the orientation irregularities when the attachment of the first and second substrates is performed at a temperature of about 80° C. or so (in the case of FIG. 6, it is performed at room temperature), provided that the light modulation device is manufactured in the same manner as in the case of FIG. 6. Through the comparison of FIGS. 6 and 7, it can be confirmed that the orientation irregularities can be greatly improved by means of temperature control during the attachment process.

Figure 8:
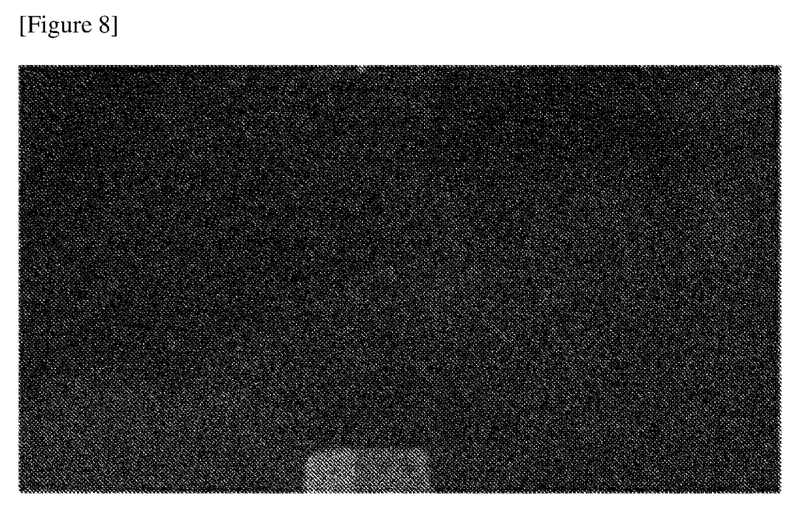
FIG. 8 is a view showing a result at the time of performing heat treatment after attachment of the first and second substrates.

FIG. 8 is the result of observing the orientation irregularities when the first and second substrates are maintained at a temperature of about 80° C. or so for 5 minutes or so in the attached state after attachment of the first and second substrates, provided that the light modulation device is manufactured in the same manner as in the case of FIG. 6. Through the comparison of FIGS. 6 and 8, it can be confirmed that the orientation irregularities can be greatly improved by means of the heat treatment after attachment.

The manufacturing process of the light modulation device of the present disclosure may also further perform appropriate necessary steps in addition to the steps described above.

For example, as shown in FIG. 4, a process of curing the sealant applied after the attachment via a sealant curing part (406) or a step of cutting the prepared laminated structure (structure of the light modulation film layer) of the first and second substrates by passing an appropriate cutting part (407) may also be performed.

In addition, if necessary, a process of attaching another element, for example, a polarization layer, and the like to one or both sides of the laminated structure (light modulation film layer) may also be performed.

Finally, the manufactured light modulation device (or light modulation film layer) may be recovered by the wind roll (408).

Through such processes, it is possible to effectively and quickly manufacture a light modulation device in which a desired adhesive force and orientation state are achieved.

The invention claimed is:

1. A method for manufacturing a light modulation device, comprising:
    transferring a first substrate between a first unwind roll and a take-up roll, wherein an adhesive layer is disposed on a first surface of the first substrate, wherein the adhesive layer comprises a cured product of a curable adhesive composition;
    transferring a second substrate between a second unwind roll and the take-up roll, wherein the second substrate includes a spacer and a liquid crystal alignment film formed on a first surface of the second substrate during the transfer and prior to an attachment with the adhesive layer of the first substrate;
    attaching the first and second substrates via respective first surfaces thereof by passing the first and second substrates through an opening between adjacent attachment rolls to form a light modulation device; and
    heat-treating the first substrate before the attaching of the first and second substrates,
    wherein the light modulation device comprises the first surface and the second substrate having the spacer, liquid crystal alignment film and the adhesive layer disposed therebetween, and wherein the spacer maintains a gap between the first and second substrates.

2. The method for manufacturing a light modulation device according to claim 1, wherein no liquid crystal alignment film is formed on the surface of the first substrate.

3. The method for manufacturing a light modulation device according to claim 1, wherein the first substrate further comprises a release film covering the adhesive layer prior to the attachment of the first and second substrates, and the method further comprises peeling the release film from the adhesive layer prior to the attachment of the first and second substrates.

4. The method for manufacturing a light modulation device according to claim 1, wherein the second substrate further comprises a protective film covering the first surface of the second substrate prior to forming the spacer and the liquid crystal alignment film on the first surface of the second substrate, and the method further comprises peeling the protective film from the first surface of the second substrate prior to forming the spacer and the liquid crystal alignment film on the first surface of the second substrate.

5. The method for manufacturing a light modulation device according to claim 1, further comprising supplying a sealant to an edge of the first surface of the second substrate before the attachment of the first and second substrates.

6. The method for manufacturing a light modulation device according to claim 5, further comprising supplying a liquid crystal compound to the first surface of the second substrate before the attachment of the first and second substrates.

7. The method for manufacturing a light modulation device according to claim 5, further comprising supplying a liquid crystal compound and a dichroic dye to the first surface of the second substrate before the attachment of the first and second substrates.

8. The method for manufacturing a light modulation device according to claim 5, further comprising supplying a liquid crystal compound and a chiral dopant to the first surface of the second substrate before the attachment of the first and second substrates.

9. The method for manufacturing a light modulation device according to claim 8, wherein the first and second substrates are attached such that a ratio of a distance (d) between the first and second substrates to a chiral pitch (p) formed by the chiral dopant is less than 1.

10. The method for manufacturing a light modulation device according to claim 1, wherein the spacer is a partition wall spacer.

11. The method for manufacturing a light modulation device according to claim 1, wherein the heat treatment is performed at a temperature of 80° C. or more for 30 seconds or more.

12. A method for manufacturing a light modulation device, comprising:
    transferring a first substrate between a first unwind roll and a take-up roll, wherein an adhesive layer is disposed on a first surface of the first substrate, wherein the adhesive layer comprises a cured product of a curable adhesive composition;
    transferring a second substrate between a second unwind roll and the take-up roll, wherein the second substrate includes a spacer and a liquid crystal alignment film formed on a first surface of the second substrate during the transfer and prior to an attachment with the adhesive layer of the first substrate; and
    attaching the first and second substrates via respective first surfaces thereof by passing the first and second substrates through an opening between adjacent attachment rolls to form a light modulation device,
    wherein the attachment of the first and second substrates is performed within a temperature range of more than 50° C. and less than 90° C., and
    wherein the light modulation device comprises the first surface and the second substrate having the spacer, liquid crystal alignment film and the adhesive layer disposed therebetween, and wherein the spacer maintains a gap between the first and second substrates.

13. A method for manufacturing a light modulation device, comprising:
    transferring a first substrate between a first unwind roll and a take-up roll, wherein an adhesive layer is disposed on a first surface of the first substrate, wherein the adhesive layer comprises a cured product of a curable adhesive composition;
    transferring a second substrate between a second unwind roll and the take-up roll, wherein the second substrate includes a spacer and a liquid crystal alignment film formed on a first surface of the second substrate during the transfer and prior to an attachment with the adhesive layer of the first substrate;

attaching the first and second substrates via respective first surfaces thereof by passing the first and second substrates through an opening between adjacent attachment rolls to form a light modulation device; and heat-treating the light modulation device after the attachment of the first and second substrates, wherein the light modulation device comprises the first surface and the second substrate having the spacer, liquid crystal alignment film and the adhesive layer disposed therebetween, and wherein the spacer maintains a gap between the first and second substrates.

14. The method for manufacturing a light modulation device according to claim 13, wherein the heat treatment is performed at a temperature of 80° C. or more for 30 seconds or more.

* * * * *